United States Patent [19]
Portz et al.

[11] 3,771,259
[45] Nov. 13, 1973

[54] PROCESS FOR THE MANUFACTURE OF CALCIUM CARBIDE OF PREDETERMINED QUALITY

[75] Inventors: Wilhelm Portz, Kierdorf; Günther Rittershausen, Knapsack near Cologne, both of Germany

[73] Assignee: Knapsack Aktiengesellschaft, Knapsack bei Cologne, Germany

[22] Filed: July 8, 1970

[21] Appl. No.: 53,287

[30] Foreign Application Priority Data
July 12, 1969 Germany.................. P 19 35 567.0

[52] U.S. Cl.......................... 48/60, 48/59, 423/441, 252/182
[51] Int. Cl............................................. C10h 21/10
[58] Field of Search...................... 23/208 R; 48/59, 48/60; 252/182; 423/441

[56] References Cited
UNITED STATES PATENTS
1,319,426  10/1919  Slocum ........................ 23/208 R X
1,941,172  10/1933  Hibi .............................. 23/208 R X FOREIGN PATENTS OR APPLICATIONS
1,073,458  1/1960  Germany.......................... 23/208 R Primary Examiner—M. Weissman
Attorney—Connolly and Hutz

[57] ABSTRACT

Production of calcium carbide of low gas yield from calcium carbide of higher gas yield. Calcium oxide having a particle size of between 1 and 8 mm is introduced, preferably during tapping, into the melt of such calcium carbide of higher gas yield.

3 Claims, No Drawings

PROCESS FOR THE MANUFACTURE OF CALCIUM CARBIDE OF PREDETERMINED QUALITY

The present invention relates to the production of calcium carbide of low gas yield from calcium carbide of higher gas yield, wherein an alkaline earth metal oxide is introduced into a melt of calcium carbide of such higher gas yield. The term "gas yield" as used herein defines the quantity of acetylene, expressed in liters moist gas at 15° C, which is obtained by subjecting calcium carbide — briefly called carbide hereinafter — to reaction with water. The gas yield is a generally recognized index of the carbide's quality.

Electrothermal reduction furnaces of the type used for the production of carbide therein are normally constructed and operated so as to obtain carbide of high gas yield.

In those cases, for example, in which the carbide is intended to yield acetylene for use in chemical syntheses, it is customary to produce carbide of high gas yield, i.e., carbide producing substantially 280 liters acetylene per kg carbide, as this carbide grade enables the furnace to be operated under commercially very attractive conditions and in reliable manner.

For some years, however, the use of special grade carbides has gained interest for special applications including, for example, the production of calcium cyanamide. The gas yield of these carbides is often required to be sharply focused so as to correspond to a predetermined low value, for example, 240 liters acetylene per kg carbide.

To produce these carbide grades, it has been necessary heretofore appropriately to modify the composition of the mixture of ores and fluxes in the electric furnace, during the production of carbide therein. This process is beset with considerable disadvantages. Carbide of low gas yield has a fusion point lower than that of carbide of high gas yield, and this naturally affects the path of the isothermal lines in the furnace. This in turn effects a change of the melting pots around the electrodes, and the carbide produced at the individual electrodes then ceases to flow together. For this reason, it has been necessary in modern large furnaces to drastically limit the production of such carbide grade to periods of 2 to 3 days only. Following this, it is highly desirable to resume the production of carbide of higher gas yield in the furnace, before excessive damage is done to it. This is a complicated procedure, in which each changeover effects the formation of considerable quantities of off-grade material which cannot be made into carbide for sale.

Attempts have already been made with the object of producing calcium carbide having a low softening or fusion point by dissolving calcium oxide in a melt of carbide. The experiments made to this effect have, however, all failed to produce satisfactory results, as only a minor proportion of the calcium oxide was found to be dissolved in the melt, whilst the bulk of the lime appeared undissolved in the final product.

In view of the known heat of fusion data and enthalpies of the substances participating in the reaction, the carbide could hardly be expected to effect the complete dissolution of the calcium oxide therein. In no case, however, could the carbide block be expected to be homogeneous, even after such addition.

This culminated in a preconception which has long been held in the art with the result that the use of calcium oxide as a leaning agent for molten calcium carbide was believed to be unpromising and unapt to produce a homogeneous final product. As a result of this, carbide of low gas yield has been produced heretofore by the technically and commercially unattractive change of the composition of the mixture of flux and ores in the carbide furnace.

The process of the present invention has now been found to enable this existing preconception to be set aside.

As has unexpectedly been found, carbide of low gas yield, i.e., carbide producing between 230 and 260 liters acetylene per kg carbide, can be produced in easy manner from calcium carbide of higher gas yield by adding calcium oxide having a particle size of between 1 and 8 mm to a melt of calcium carbide yielding, for example, between 280 and 300 liters acetylene per kg carbide. The calcium oxide is more particularly added at a rate consistent with the reduction of the acetylene yield contemplated for the feed carbide.

Conditional upon the use the final product is put to, the carbide's properties may be modified in a plurality of respects by the addition of calcium oxide, which is preferably used in the form of burnt lime. The calcium oxide may be used in combination with further inorganic compounds, such as flour spar or aluminum oxide, which preferably have a particle size the same as that of the calcium oxide.

A preferred feature of the present process comprises introducing the calcium oxide addend into the jet of molten carbide which is produced on tapping.

While the uniform introduction of the leaning agent into the carbide jet is desirable, the fact remains that this is not a mandatory requirement. Even in those cases in which the leaning agent was added to the carbide over a period of time corresponding to substantially half the period necessary to fill a carbide-receiving crucible, the resulting carbide block was still homogeneous. As the carbide is tapped of into crucibles of known and constant volume, it is possible to produce carbide of pre-determined quality by the addition of a corresponding proportion of addend, which is to be calculated for each crucible.

The process of the present invention offers a still further advantage: Carbide of high gas yield is produced within relatively short periods, at high throughput rates and at high furnace temperatures with the result that foreign oxides which appear in the coke undergo substantially stronger reduction than in the production of carbide of low gas yield, at correspondingly lower furnace temperatures. In other words, the present process enables carbide of low gas yield with merely a slight proportion of contaminants therein — this is vital to its use, for example, in the production of calcium cyanamide — to be produced in improved space/time-yields.

EXAMPLE 1

Altogether 250 kg burnt lime having a particle size of between 1 and 8 millimeters were added to 1.45 metric tons carbide (gas yield = 290 liters $C_2H_2$ per kg), i.e., while the carbide was tapped off from an electric furnace and delivered to a crucible. After cooling, the carbide block was crushed. The crushed material was inspected and analyzed. It was found to be homogeneous carbide yielding 245 liters $C_2H_2$ per kg.

EXAMPLE 2

An adjustable dosing screw feeder was mounted above the tapping hole of 55 megawatt carbide furnace. The feeder was used to convey lime from a reservoir to a conduit delivering the lime to the jet of carbide issuing through the tapping hole. The screw feeder was standardized to deliver a given quantity of lime per rotation. By means of a switch release of the feeder was effected for a certain number of revolutions, following which the feeder was automatically arrested. This enabled the quantity of lime addend to be exactly controlled. The time during which the addend is introduced into the jet of carbide can be pre-selected by means of a further switch enabling the speed of rotation per unit of time to be varied.

The crucibles used in the present example had a volume of between 800 and 850 liters. They were filled immediately after they were placed ahead of the tapping hole.

a. 220 kg burnt lime with a particle size of between 1 and 8 mm were metered within 3 minutes into the jet of 1,480 kg molten calcium carbide (gas yield = 285 liters acetylene per kg carbide). The total time needed to fill the crucibles was 6 minutes. 1.7 metric tons of a homogeneous carbide block were obtained. The lean carbide yielded 245 liters acetylene per kg.

b. 250 kg burnt lime with a particle size of between 1 and 8 mm were metered within 6 minutes into the jet of 1,400 kg molten calcium carbide (gas yield = 300 liters acetylene per kg carbide). The total time needed to fill the crucible was 7 minutes. 1.7 metric tons of a homogeneous carbide block were obtained. The lean carbide yielded 250 liters acetylene per kg.

We claim:

1. A process for leaning calcium carbide yielding between 280 and 300 liters acetylene when reacted with water by using a calcium compound as leaning material which comprises introducing into a calcium carbide melt calcium oxide having a particle size between 1 and 8 mm as a leaning material with the resultant formation of a homogeneous mixture of calcium carbide and calcium oxide, and cooling the mixture obtained, the calcium oxide being introduced in an amount sufficient to reduce the acetylene yield of the final mixture to an amount between 230 and 260 liters per kg of the final mixture.

2. The process as claimed in claim 1, wherein the calcium oxide is added to the jet of molten carbide produced on tapping.

3. The process as claimed in claim 1 wherein the calcium oxide is introduced in combination with at least one inorganic compound selected from fluor spar and aluminum oxide, with a particle size substantially the same as that of the calcium oxide.

* * * * *